2,996,510
QUATERNISED PYRIDINE ALDOXIMES
Albert Lawrence Green, Salisbury, England, assignor to National Research Development Corporation, London, England, a British corporation
No Drawing. Filed Sept. 5, 1958, Ser. No. 759,146
4 Claims. (Cl. 260—294.8)

The present invention relates to quaternised pyridine aldoximes which may be used as therapeutic agents to counteract the inhibiting effect of various organo-phosphorus compounds on the enzyme cholinesterase in animal bodies.

Quaternised pyridine aldoximes are known to be particularly effective antidotes to these cholinesterase inhibitors as they restore the activity of cholinesterase that has been inhibited and in some instances decompose the inhibitor in the animal body.

It has been discovered that quaternised pyridine aldoxime hydrocarbonsulphonates, that is N-alkyl hydroxyiminomethylpyridinium hydrocarbonsulphonates, have a superior physiological effect to known quaternised pyridine aldoximes such as pyridine-2-aldoxime methiodide because they are very water soluble and small relatively concentrated doses in solution can be given.

The high solubility is due to the hydrocarbon-sulphonate radical and the general formula of the new compounds is

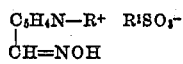
$$\begin{array}{c} C_5H_4N\text{—}R^+ \quad R^1SO_3^- \\ | \\ CH\text{=}NOH \end{array}$$

where R is an alkyl group which is a lower alkyl group such as a methyl, ethyl, propyl or iso-propyl group, $R^1$ is a monovalent hydrocarbon radical such as methyl and the CH=NOH radical is in the 2 or 4 position in the pyridine ring. R and $R^1$ in fact are preferably methyl groups. Throughout the specification and claims "alkyl" implies a lower alkyl group.

The two most preferred new compounds are firstly N-methyl-2-hydroxy-iminomethylpyridinium methane-sulphonate which will be referred to as P2S and secondly N-methyl-4-hydroxyiminomethylpyridinium methane-sulphonate which will be referred to as P4S.

The new aldoximes are effective antidotes to the cholinesterase inhibiting action of organo-phosphorous compounds commonly used as pesticides and nerve gases such as dialkyl phosphoro-fluoridates, alkyl alkylphosphonofluoridates, tetraalkyl pyrophosphates and dialkyl p-nitrophenylphosphates and when used alone can cause an increase of about two to four times in the 50% lethal dose of the organo-phosphorus compound. (The 50% lethal dose will kill (on average) 50% of the animals to which it is administered).

The new aldoximes are relatively non-toxic and the 50% lethal dose, when injected intramuscularly, is in the range 200 to 350 milligrams/kilogram weight of animal or monkeys, guinea pigs, rabbits, rats and mice. Such doses are more than five times the dose of about 30 milligram/kilogram at which the therapeutic action has almost reached its maximum and does not appreciably increase further with increase in dosage.

It may be assumed that about 30 milligram/kilogram would be the most effective dosage for man and would be a perfectly safe dosage. Doses of 20 milligram/kilogram have been given by intramuscular injections to humans without adverse effects.

As the new aldoximes are extremely soluble in water the limit to the strength of solution administered by intramuscular injection is set solely by the strength at which pain or muscle damage is caused. No damage or appreciable discomfort is caused by solutions of 10%, 15% or 20% strength and at these strengths about 10 ccs. would be required to give a man weighing 70 kilograms the most effective dose. This would require three or four intramuscular injections each of 2–3 ccs. In an emergency, of course, when the alternative to treatment may be death, more concentrated solutions causing pain and possibly minor damage may be given so that two injections or only one injection would be sufficient.

The aldoximes may be given orally and doses of more than 100 milligrams/kilogram have been given to humans without any adverse effects. When given orally the aldoximes are not so quick acting as when injected so that therapeutic treatment is preferably by injection. Oral administration is however preferable for prophylactic treatment and experiments have shown that an oral dose of the aldoximes given to animals raises the 50% lethal dose of cholinesterase inhibitors for several hours. It appears that prolonged treatment may be given as oral administration to rabbits of 50 milligrams/kilogram doses of P2S daily for one month produced no discernible effects.

Atropine is a known antidote for cholinesterase inhibitors and when used alone in animals can cause the 50% lethal dose to be doubled. It has now been discovered that when a dose of a mixed solution of P2S and atropine sulphate is administered the 50% lethal dose of an organo-phosphorus compound is increased considerably. For example, doses of 30 milligram/kilogram of P2S and 17.4 milligram/kilogram of atropine sulphate when administered intramuscularly one minute after poisoning by tetraethyl pyrophosphate increase the 50% lethal dose to mice, guinea pigs and rabbits by 20 times.

When applied to human beings the solution is made up preferably with the order of 100 to 500 parts by weight of a new aldoxime to 1 of atropine.

The reaction of the new aldoximes on the organo-phosphorus cholinesterase inhibitors depends upon the pH value of the reaction solution.

Thus when P2S reacts with an organo-phosphorus compound such as iso-propyl methylphosphonofluoridate, N-methyl-2-cyanopyridinium methane-sulphonate is formed with non-toxic iso-propyl methylphosphonic acid if the pH value of the solution is of the order of that of blood, around 7.4. If the pH value is about 9 the reaction proceeds further and the N-methyl-cyanopyridinium methane-sulphonate is converted into N-methyl-2-pyridone and hydrogen cyanide.

On the other hand, when P4S is reacted with an organo-phosphorus compound such as tetraethyl pyrophosphate an oxime phosphonate is formed when the pH value of the solution is about that of blood at 7.4 and N-methyl-4-cyanopyridinium methane-sulphonate is formed only when the pH value of the solution is raised to about 9 or 10. The formation of hydrogen cyanide is negligible even at pH values of 10.

Solid P2S is stable indefinitely and when P2S solution was adjusted to pH 6.0 and freeze dried into ampoules no deterioration was detected over an 80 day period of storage. Solid P2S is unstable at 150° C. and when P2S solutions are heated small quantities of cyanide are produced. The formation is accompanied by a change to orange-brown and is dependent upon the pH value of the solution. P2S solution cannot, therefore, be sterilised by autoclaving; it may however be safely and surely sterilised by Seitz filtration.

Prolonged storage of P2S should be in the solid form as P2S solutions decompose slowly with the formation of cyanide. The rate of decomposition and cyanide formation depends upon the pH value of the solution. The most favourable pH value for storage appears to be about 4.0; after 100 days less than 0.1% of cyanide was formed for a 3% loss of P2S in a 20% aqueous solution having this pH value.

The N-alkyl hydroxyiminomethylpyridinium hydrocarbon-sulphonates can be prepared by reacting a pyridine aldoxime with an alkyl hydrocarbon sulphonate.

1 kilogram of P2S may be prepared in the following manner. 1 kilogram of pyridine 2-aldoxime is boiled under reflux for two to three hours with 1.2 litres of methyl methane-sulphonate in 10 litres of benzene. A brown oil is formed which solidifies when cool. The crude product (yield about 1.5 kilograms) is filtered off and dried in vacuo. The brown solid obtained is dissolved in 4 litres of hot ethanol and ethyl acetate is slowly added to the boiling solution until crystallisation begins. When cool about 1 kilogram of white crystals of the methane-sulphonate product may be filtered off, washed with a little ethyl acetate and dried in vacuo. Other solvents such as ethyl alcohol may be used instead of benzene.

P4S and the other new N-alkyl hydroxyiminomethyl-pyridinium hydrocarbon-sulphonates may be prepared in a similar manner by reacting the appropriate pyridine aldoxime with excess of the appropriate hydrocarbon-sulphonate in a suitable organic solvent such as benzene or ethyl alcohol.

I claim:
1. N-methyl 2-hydroxyiminomethylpyridinium methane-sulphonate.
2. N-methyl 4-hydroxyiminomethylpyridinium methane-sulphonate.
3. A composition of matter having the following formula:

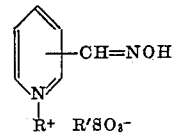

where R and R′ are lower alkyl groups and the CH=NOH radical is in the 2 position in the pyridine ring.

4. A composition of matter having the following formula:

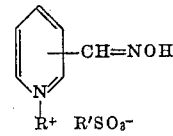

where R and R′ are lower alkyl groups and the CH=NOH radical is in the 4 position in the pyridine ring.

References Cited in the file of this patent
UNITED STATES PATENTS
2,816,113    Wilson et al. _____ Dec. 10, 1957
OTHER REFERENCES
Lenart: Ber. Deut. Chem., vol. 47, p. 809 (1914).